(12) United States Patent
Jatti et al.

(10) Patent No.: US 12,315,503 B2
(45) Date of Patent: May 27, 2025

(54) CUSTOMIZED INTERFACE BETWEEN ELECTRONIC DEVICES

(71) Applicant: ARRIS Enterprises LLC, Suwanee, GA (US)

(72) Inventors: Vinod Jatti, Karnataka (IN); Santosh Basavaraj Budni, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 361 days.

(21) Appl. No.: 17/477,786

(22) Filed: Sep. 17, 2021

(65) Prior Publication Data

US 2022/0130381 A1    Apr. 28, 2022

Related U.S. Application Data

(60) Provisional application No. 63/094,995, filed on Oct. 22, 2020.

(51) Int. Cl.
*G10L 15/22* (2006.01)
*H04L 67/30* (2022.01)

(52) U.S. Cl.
CPC .............. *G10L 15/22* (2013.01); *H04L 67/30* (2013.01)

(58) Field of Classification Search
CPC ....... H04L 67/303; H04L 67/30; G10L 15/22; G10L 2015/223
See application file for complete search history.

(56) References Cited

U.S. PATENT DOCUMENTS

| 10,089,070 | B1* | 10/2018 | Kanjariya | G10L 15/22 |
| 2015/0154976 | A1* | 6/2015 | Mutagi | G06F 3/167 |
| | | | | 704/275 |
| 2017/0236512 | A1* | 8/2017 | Williams | G06F 3/165 |
| | | | | 381/79 |
| 2018/0165061 | A1* | 6/2018 | Nicolich-Henkin | G06F 3/167 |
| 2018/0262497 | A1* | 9/2018 | Raje | G06F 9/44542 |
| 2018/0366108 | A1* | 12/2018 | Mukherjee | G06F 16/90335 |
| 2019/0245713 | A1* | 8/2019 | Lo | H04L 12/2834 |
| 2021/0035561 | A1* | 2/2021 | D'Amato | G06F 3/167 |
| 2021/0193137 | A1* | 6/2021 | Smith | G06F 3/165 |

* cited by examiner

*Primary Examiner* — Mark Villena
(74) *Attorney, Agent, or Firm* — Wenderoth, Lind & Ponack, L.L.P.

(57) ABSTRACT

A user experience can be enhanced by providing an electronic device, such as a principal network device, that allows for a customizable profile configuration associated with any one or more users, one or more electronic devices, or both. A user can configure the profile configuration so that the user has a consistent, familiar, and customized interface to one or more auxiliary network devices, the principal network device and/or any other electronic devices. The user can have a uniform experience no matter where the user and/or any electronic device is located as the principal network device, for example, can communicate with a network resource to obtain the profile configuration associated with the user.

20 Claims, 4 Drawing Sheets

| Profile Identifier 250 | | | |
|---|---|---|---|
| Action 252 | Default Command 254 | Profile Command 256 | Profile Response 258 |
| Open OTT application | <device name> open <OTT application> | <single-handclap> <OTT application> | <response 1> |
| Search content | <device name> search for <content> on <OTT application>" | <twice-handclap> <content> | <response 2> |
| Return to HOME menu | <device name> go to home | <single-whistle> | <response 3> |
| Show calendar | <device name> show calendar | <single-finger-snap> | <response 4> |
| Check weather | <device name> What is the weather <today/date/time> | <double-whistle> | <response 5> |

CUSTOMIZED INTERFACE BETWEEN ELECTRONIC DEVICES

BACKGROUND

Companies are increasingly providing Multiple Access Point (MAP) architecture or Home Network Controller (HNC) type of home wireless fidelity (Wi-Fi) management, with multiple access point devices and/or extender access point devices within the home to improve Quality of Experience (QoE) of the user of various client devices by offering extended coverage with seamless roaming in a network environment. Access point devices and extender access point devices can communicate with any number of other network devices or client devices (collectively referred to as electronic devices) in the network environment.

Generally, a user of a network environment can utilize a variety of electronic devices within a network environment, for example, multiple network devices can be coupled to various client devices. These electronic devices can each have associated interfaces such that a user is required to use different commands or cumbersome commands with each electronic device. A user can become frustrated with the interaction due to the complexity of the interfaces, the number of different interfaces, or the lack of customization of the interfaces among the various electronic devices. Thus, there is a need to provide a customized interface and seamless transition and interaction between the electronic devices of a network environment to enhance the QoE of the user.

SUMMARY

According to aspects of the present disclosure there are provided novel solutions for providing a customizable interface and seamless transition between electronic devices, for example, between one or more network devices. With evolving technology, device manufacturers are providing cost effective voice interface as an add-on feature to many network devices that are distributed or used throughout a network environment. Each network device can have an associated user interface that requires the user to convey or utilize different commands to obtain the desired functionality. According to the provided novel solutions, a network device can provide for customized profile configurations that allow a user to set preferences or customizations for interaction with one or more other network devices. For example, a user can customize a profile configuration at a principal network device so that the principal network device can interface with one or more auxiliary network devices and/or client devices to provide the user with a seamless interaction with various electronic devices based on the profile configuration. In this way, the user's experience is enhanced or improved by having a profile configuration that can be utilized with multiple network devices that can control, operate, or interface with various client devices.

An aspect of the present disclosure provides a principal network device for interfacing with one or more auxiliary network devices. The principal network device includes a memory storing one or more computer-readable instructions and a processor configured to execute the one or more computer-readable instructions to interface with one or more auxiliary network devices, receive a first profile command, determine a first profile configuration associated with the first profile command, determine an auxiliary network device of the one or more auxiliary network devices associated with the first profile command, and send the instruction to the auxiliary network device.

In an aspect of the present disclosure, the processor is further configured to execute the one or more computer-readable instructions to receive from the auxiliary network device a response, format the response as a profile response based on the first profile configuration associated with the first profile command, and send the profile response to an output device.

In an aspect of the present disclosure, the processor is further configured to execute the one or more computer-readable instructions to receive a voice command and determine the first profile configuration associated with the first profile command based on the voice command.

In an aspect of the present disclosure, the voice command comprises a login request, and the processor is further configured to execute the one or more computer-readable instructions to receive the login request, send the login request to a network resource, receive an authentication response from the network resource, and wherein determining the first profile configuration is based on the authentication response.

In an aspect of the present disclosure, the first profile command comprises a request to customize a response provided by the auxiliary network device for a particular profile command, and wherein sending the instruction to the auxiliary network device comprises one or more instructions to configure the response provided by the auxiliary network device.

In an aspect of the present disclosure, the first profile command comprises a non-vocal command.

In an aspect of the present disclosure, the processor is further configured to execute the one or more computer-readable instructions to receive a second profile command, determine a second profile configuration associated with the second profile command, wherein the second profile configuration is different than the first profile configuration, translate the second profile command to an instruction based on the auxiliary network device and the second profile configuration, and send the instruction to the auxiliary network device.

An aspect of the present disclosure provides a method for a principal network device to interface with one or more auxiliary network devices. The method comprises receiving a first profile command, determining a first profile configuration associated with the first profile command, determining an auxiliary network device of the one or more auxiliary network devices associated with the first profile command, translating the first profile command to an instruction based on the auxiliary network device and the first profile configuration, and send the instruction to the auxiliary network device.

In an aspect of the present disclosure, the method further comprises receiving from the auxiliary network device a response, formatting the response as a profile response based on the first profile configuration associated with the first profile command, and sending the profile response to an output device.

In an aspect of the present disclosure, the method further comprises receiving a voice command and determining the first profile configuration associated with the first profile command based on the voice command.

In an aspect of the present disclosure, the method further comprises receiving a login request, wherein the voice command comprises the login request, sending the login request to a network resource, receiving an authentication response from the network resource, and wherein determining the first profile configuration is based on the authentication response.

In an aspect of the present disclosure, the method further comprises a request to customize a response provided by the auxiliary network device for a particular profile command, and wherein sending the instruction to the auxiliary network device comprises one or more instructions to configure the response provided by the auxiliary network device.

In an aspect of the present disclosure, the method such that the first profile command comprises a non-vocal command.

In an aspect of the present disclosure, the method further comprises receiving a second profile command, determining a second profile configuration associated with the second profile command, wherein the second profile configuration is different than the first profile configuration, translating the second profile command to an instruction based on the auxiliary network device and the second profile configuration, sending the instruction to the auxiliary network device.

An aspect of the present disclosure provides a non-transitory computer-readable medium of a principal network device for interfacing with one or more auxiliary network devices. The program when executed by a processor of the principal network device, causes the principal network device to perform one or more operations including the steps of the methods described above.

Thus, according to various aspects of the present disclosure described herein, it is possible to provide a principal network devices that interfaces with one or more auxiliary network devices so as to provide a user with a customizable user environment. Each user can customize the network environment based on a profile configuration associated with the user such that no matter the type of network device or the location, the user's experience is consistent. In this way, the user is provided with an enhanced or improved QoE.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
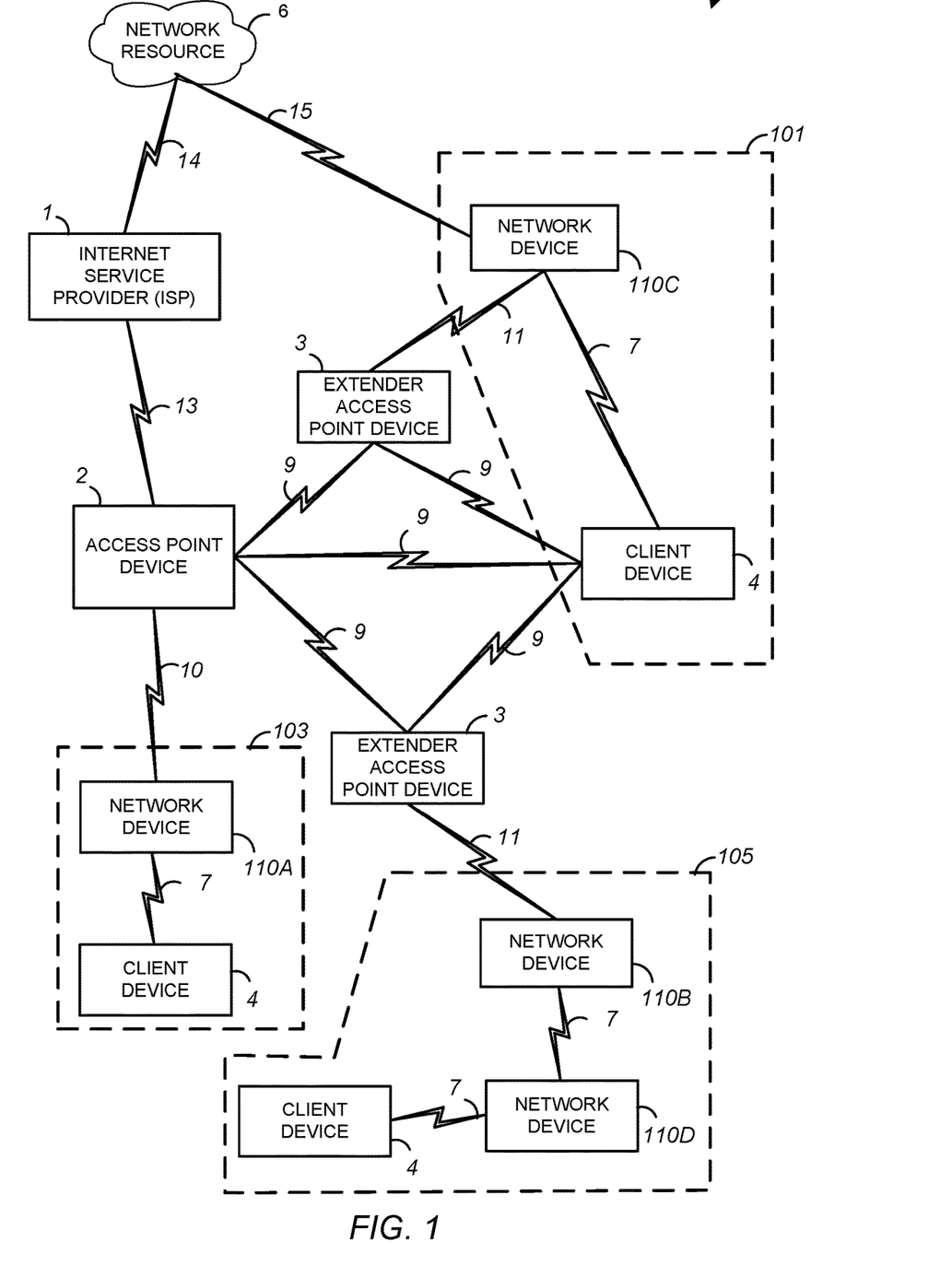
FIG. 1 is a schematic diagram of a network environment, according to one or more aspects of the present disclosure.

FIG. 1 is a schematic diagram of a network environment 100, according to one or more aspects of the present disclosure. It should be appreciated that various example embodiments of inventive concepts disclosed herein are not limited to specific numbers or combinations of devices, and there may be one or multiple of some of the aforementioned electronic devices or network devices in the network environment 100, which may itself consist of multiple communication networks and various known or future developed wireless connectivity technologies, protocols, devices, and the like.

A network environment 100 can be implemented for various types of networks including, for example, a home network where multiple users interact with or utilize multiple client devices. While FIG. 1 illustrates an exemplary configuration of a network environment, the present disclosure contemplates any other one or more connections and one or more electronic devices, for example, the electronic devices illustrated in FIG. 1.

As shown in FIG. 1, the main elements of the network environment 100 include an access point device 2 connected to the network resource 6 via an Internet Service Provider (ISP) 1, one or more network devices 110A, 110B, 110C and 110D (collectively referred to as network device(s) 110) connected to the access point device 2 via one or more extender access point devices 3, and one or more client devices 4 connected to one or more network devices 110, one or more extender access point devices 3, and/or access point device 2. The network environment 100 shown in FIG. 1 can include one or more wireless electronic devices (e.g., extender access point devices 3, one or more network devices 110 and client devices 4 that may be connected in one or more wireless networks (e.g., private, guest, iControl, backhaul network, or Internet of things (IoT) network) within the network environment 100. Additionally, there could be some overlap between wireless electronic devices (e.g., extender access point devices 3, network devices 110, and client devices 4) in the different networks. That is, one or more wireless electronic devices could be located in more than one network. For example, the extender access point devices 3 could be located both in a private network for providing content and information to any of client devices 4 and/or network devices 110 and also included in a backhaul network or an iControl network. In one or more embodiments, any one or more electronic devices can be wired network devices.

Starting from the top of FIG. 1, the ISP 1 can be any computer for connecting the access point device 2 to a network resource 6. The network resource 6 can send or transmit information or data to the ISP 1, for example, content associated with any one or more uniform resource locators (URL(s)), data associated with a particular electronic device, data associated with a particular user or group of users, any other requested information, or a combination thereof. For example, network resource 6 can include any of a server, a software and/or application, a URL, an application program interface (API), a repository (such as a database or any other storage system) or any combination thereof. The connection 14 between the network resource 6 and the ISP 1 and the connection 13 between the ISP 1 and the access point device 2 can be implemented using a wide area network (WAN), a virtual private network (VPN), a metropolitan area networks (MAN), a system area networks (SAN), a data over cable service interface specification (DOCSIS) network, a fiber optics network (e.g., FTTH (fiber to the home) or FTTX (fiber to the x), or a hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The connection 15 between the network device 110C and the network resource 6 can be any type of connection discussed herein. For example, the network resource 6 can be the same provider of the network device 110C and a backend connection 15 can be established between the network resource 6 and the network device 110C. In one or more embodiments, a network device 110C can be coupled to an ISP 1 and a network resource 6.

The access point device 2 can be, for example, an access point and/or a hardware electronic device that may be a combination modem and gateway, such as a residential gateway, that combines the functions of a modem, an access point (AP), and/or a router for providing content received from the ISP 1 to one or more electronic devices (e.g., wireless extender access point devices 3, network devices 110, and client devices 4) in the network environment 100. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP). Further, an access point device 2 can, in one or more embodiments, comprise a network device 110 and perform any of the functionality described herein with respect to, for example, network devices 110A, 110B, 110C, 110D, or a combination thereof.

The connection 9 between the access point device 2, the wireless extender access point devices 3, and client devices 4 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information associated with an asset, for example, content received from and/or communicated to ISP 1.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, network devices 110 and/or client devices 4, which may be out of range of the access point device 2. The extender access point devices 3 can also receive signals from the network devices 110 and/or client devices 4 and rebroadcast the signals to the access point device 2, or other network devices 110 and/or client devices 4. While FIG. 1 illustrates a direct connection between extender access point devices 3 and the access point device 2, the present disclosure contemplates an indirect connection as well, for example, via an additional extender access point device 3.

The connections 11 between the extender access point devices 3 and the network devices 110 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers including, but not limited to, any of a sensing device or detector, a desktop computer or a laptop, an electronic tablet, a mobile phone, a smart phone, a smart speaker, an IoT device, an iControl device, a portable music player with smart capabilities capable of connecting to the Internet, a cellular network, and/or interconnecting with other electronic devices via Wi-Fi and/or Bluetooth, other wireless hand-held consumer electronic devices, such as via connection 7 to a network device 110. Additionally, the client devices 4 can be a television (TV), an IP/QAM set-top box (STB) or a streaming media decoder that is capable of decoding audio/video content, and playing over OTT or MSO provided content received through the access point device 2

A network device 110 can combine the functionality of multiple electronic devices in a single device, for example, a set-top box, a smart speaker, a visual smart assistant, an IoT hub, a remote control, or any combination thereof. Such a network device 110 delivers compelling, personalized or customized, and aggregated services in, for example, entertainment, home control, e-health, education, utilities, productivity, or any combination thereof. Network device 110 can interface with one or more electronic devices of the network environment 100. For example, the network device 110 can connect to a client device 4 and/or another network device 110 via a connection 7. Connection 7 can utilize any one or more protocols discussed above with respect to connection 9. In one or more embodiments, a network device 110 can interface with any one or more other network devices 110 to provide a user a customizable user environment. In an example configuration, network device 110A can be coupled to a client device 4 at a user location 103, network device 110B can be coupled to a client a network device 110D at a user location 105 and network device 110C can be coupled to a client device 4 at a user location 101. Any one or more of the network devices 110 can communicate with any one or more other network devices 110 such that a user can customize a profile configuration that can be utilized at any of the one or more network devices 110 at any one or more user locations, such as user locations 101, 103, and/or 105. Any one or more of the network devices 110 can be a principal network device and/or an auxiliary network device. A user at user location 103 can vocalize a user customized command to the network device 110A, the command is analyzed by network device 110A based on a profile configuration determined to be associated with the user, the user customized command can be translated to a command or instruction suitable for processing by network device 110D at a user location 105. For example, a user at user location 103 could vocalize a customized command to network device 110A for the lights at user location 105 to be turned on. Client device 4 at user location 105 can be a controllable smart switch that controls one or more lights. The network device 110A can translate or format the customized command to an instruction interpretable by the network device 110B. The network device 110B can then cause client device 4 to turn on the requested lights. As another example, a user at user location 105 can instruct a network device 110B to obtain weather information based on a customized user command. The network device 110B can translate or format the customized user command to an instruction interpretable by network device 110D. Network device 110D in response to the instruction can respond with the requested weather information from a client device 4, a network resource, any other network device 110, software internal to the network device 110D, or any combination thereof. The network device 110B can output the received weather information as is or can format the received weather information based on a profile configuration associated with the user and then output the formatted received weather information. Network device 110C at user location 101 can operate in a similar manner as discussed with reference to network devices 110A and 110B.

The connection 10 between the access point device 2 and the network device 110A can be implemented through a wireless connection that operates in accordance with, but is not limited to, any IEEE 802.11 protocols, for example, a connection that utilizes one or more channels. Additionally, the connection 10 between the access point device 2 and the network device 110A can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands. One or more of the connections 10 can also be a wired Ethernet connection.

In general, it is contemplated by the present disclosure that the access point device 2, the extender access point devices 3, the network devices 110, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, the network devices 110, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, the network devices 110, and the client devices 4 are further equipped with components to facilitate communication with other computing and/or network devices over the one or more network connections to local and wide area networks, wireless and wired networks, public and private networks, and any other communication network enabling communication in the network environment 100.

Figure 2A:
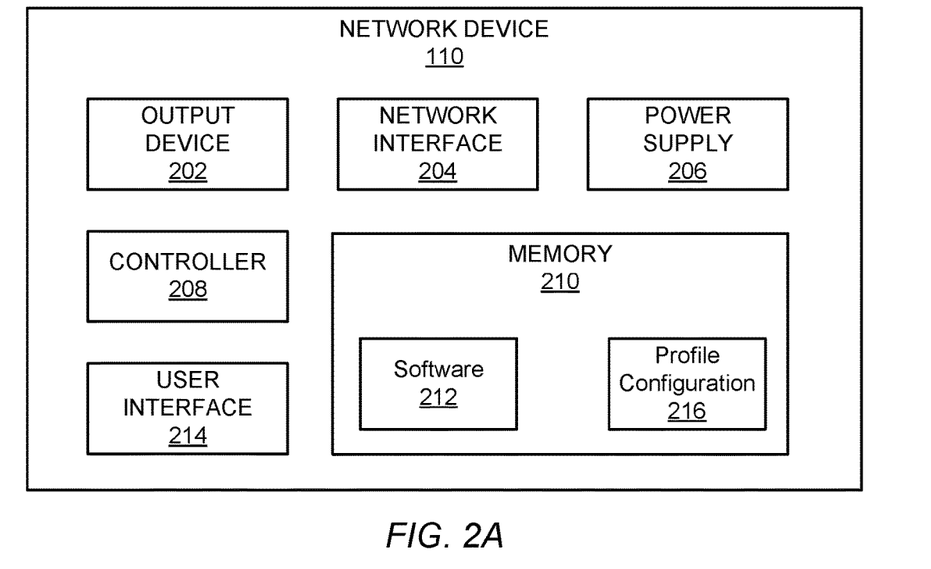
FIGS. 2A and 2B are a more detailed block diagram illustrating various aspects of a network device implemented in the network environment of FIG. 1, according to one or more aspects of the present disclosure.
Figure 2B:
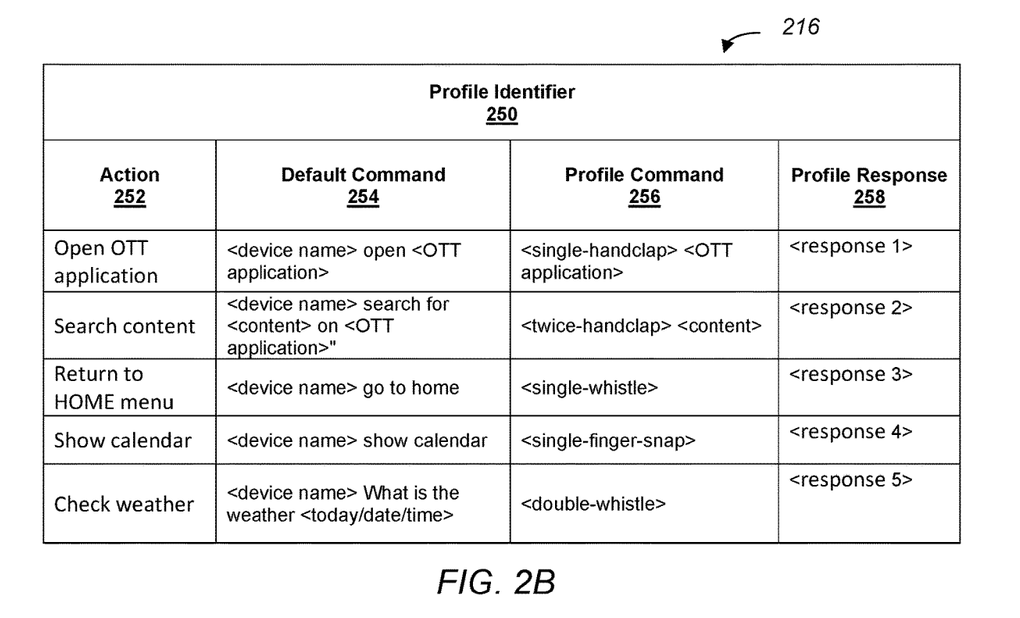

FIGS. 2A and 2B are a more detailed block diagram illustrating various components of an exemplary network device 110, implemented in the network environment 100 of FIG. 1, according to one or more embodiments. The network device 110 includes an output device 202, a network interface 204, a power supply 206, a controller 208, a memory 210, and a user interface 214. In one or more embodiments, the network device 110 can be a principal network device, an auxiliary network device, or both.

The power supply 206 supplies power to any one or more of the internal components of the network device 110, for example, through an internal bus. The power supply 206 can be a self-contained power source such as a battery pack with an interface to be powered through an electrical charger connected to an outlet (e.g., either directly or by way of another device). The power supply 206 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The network interface 204 can include, but is not limited to, various network cards, interfaces, and circuitry implemented in software and/or hardware to enable communications with the network device 110 using any of the communication protocol(s) discussed with reference to FIG. 1. For example, the network interface 204 allows for communication between the network device 110 and one or more client devices 4, and/or one or more network resources 6. In one or more embodiments, the network interface 204 can provide indirect access to network resource 6 as illustrated in FIG. 1 or a direct access to network resource 6 via a backchannel connection 15.

Output device 202 provides an audio output, a visual output, a multi-media output, or any combination thereof to a user or any one and/or more other electronic devices within a proximity of the network device 110. Output device 202 can comprise any of a speaker, a sound bar, an indicator (such as any visual indicator, for example, an light emitting diode), a display (such as a television, a monitor, a projector, and/or any other audio playback device, a video playback device, or both), any other device that is capable of providing multi-media content for consumption by a user or an electronic device, or any combination thereof. For example, output device 202 can output an audible notification, a visual notification, or both.

The user interface 214 includes, but is not limited to, any of one or more tactile inputs (for example, a push button, a selector, a dial, etc.), a camera, a keyboard, an audio input (for example, a microphone), a keypad, a liquid crystal display (LCD), a thin film transistor (TFT), a light-emitting diode (LED), a high definition (HD) or other similar display device including a display device having touch screen capabilities so as to allow interaction between one or more users and the network device 110, the network device 110 and one or more client devices 4 and/or one or more other network devices 110, or a combination thereof. For example, the user interface 214 can provide an interface for a user to create, modify, alter, view, interact with, any other type of access, or any combination thereof one or more parameters or preferences of a profile configuration 216.

The memory 210 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical drive, a hard disk or any other various layers of memory hierarchy. The memory 210 can be used to store any type of instructions, software, or algorithms including software 212 for interfacing with one or more electronic devices, such as one or more network devices 110, one or more client devices 4, a network resource 6, or any combination thereof. In one or more embodiments, software 212 includes one or more applications and/or instructions for receiving one or more profile configurations 216 that are stored in memory 210 and utilizing the one or more profile configurations 216 to control one or more electronic devices (such as one or more network devices 110, one or more client devices 4, any other electronic devices, or a combination thereof) so as to provide an enhanced user experience within the network environment 100.

As shown in FIG. 2B, a profile configuration 216 can comprise one or more parameters. The one or more parameters can comprise one or more unique profile identifiers 250, an action 252, a default command 254, a profile command 256, a profile response 258, one or more other parameters, or a combination thereof. A profile configuration 216 can be associated with a particular user, a group of users, a location, an environment, any other type of association, or a combination thereof. The profile configuration 216 allows a user to create a customizable interface with one or more network devices 110. While the profile configuration 216 is shown as stored at memory 210, in one or more embodiments, the profile configuration 216 can be stored at a remote repository, such as network resource 6, such that the user can have the same customizable experience no matter the location of the user.

The one or more profile identifiers 250 can include a unique identifier associated with a particular profile configuration 216. For example, a profile identifier 250 can be a username, an IP address, a randomly generated value, any other unique value, or a combination thereof. The profile identifier 250 can be associated with any of one or more actions 252, one or more default commands 254, one or more profile commands 256, any other parameters of a profile configuration 216, or a combination thereof.

The one or more actions 252 can comprise any one or more functionalities or features of a network device 110, a client device 4 or both. For example, one or more actions 252 can include launching an OTT application, searching content, returning to home menu or screen, showing calendar or appointments, checking weather or traffic, any other action associated with operation or control of a network device 110, a client device 4, any other electronic device, or a combination thereof.

The one or more default commands 254 can be associated with one or more actions 252. A default command can be the command or instruction expected by a network device 110. For example, a particular network device 110 can require a wake word, such as "<device name>", followed by a requested action word or phrase, such as "open . . . ", "search for . . . ", "go to . . . ", "show . . . ", "what is . . . ", any other action word or phrase, or any combination thereof.

A profile command 256 can comprise a customizable command or instruction associated with an action 252, a default command 254, or both. The customizable command or instruction 256 can be any word, phrase, sound, action, any other indication by a user, or a combination thereof. For example, a user can set a profile command 256 to a sound followed by a phrase or word, a sound alone, a word or phrase, any other sound, or any combination thereof. For example, a single handclap followed by the word or name of an OTT application, the name of a particular content or search request, a single whistle, a single finger snap, a double-whistle, a double hand-clap, etc. The profile command 256 can be a sound or a non-vocal command, a word, a phrase, or a combination thereof. A profile command 256 can be a command or instruction that is easy for a user to remember or provide. For example, many network devices 110 can require extensive commands that can be difficult for different users in a household to relay. The profile command 256 allows each user to customize the command or instruction for any given action 252 such that the needs of any particular user are met.

The controller 208 controls the general operations of the network device 110 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 212 for creating, altering, modifying, viewing or otherwise accessing any one or more profile configurations 216. Communication between any of the components (e.g., 202, 204, 206, 210, 212, 214 and/or 216) of the network device 110 can be established using an internal bus.

In one or more embodiments, one or more network devices 110A can be coupled directly or indirectly to one or more network devices 100, such as network devices 110B, 110C and/or 110D. In one or more embodiments, the network device 110 can query a network resource 6 for any one or more profile configurations 216 and receive the one or more profile configurations 216 from the network resource 6.

Figure 3:
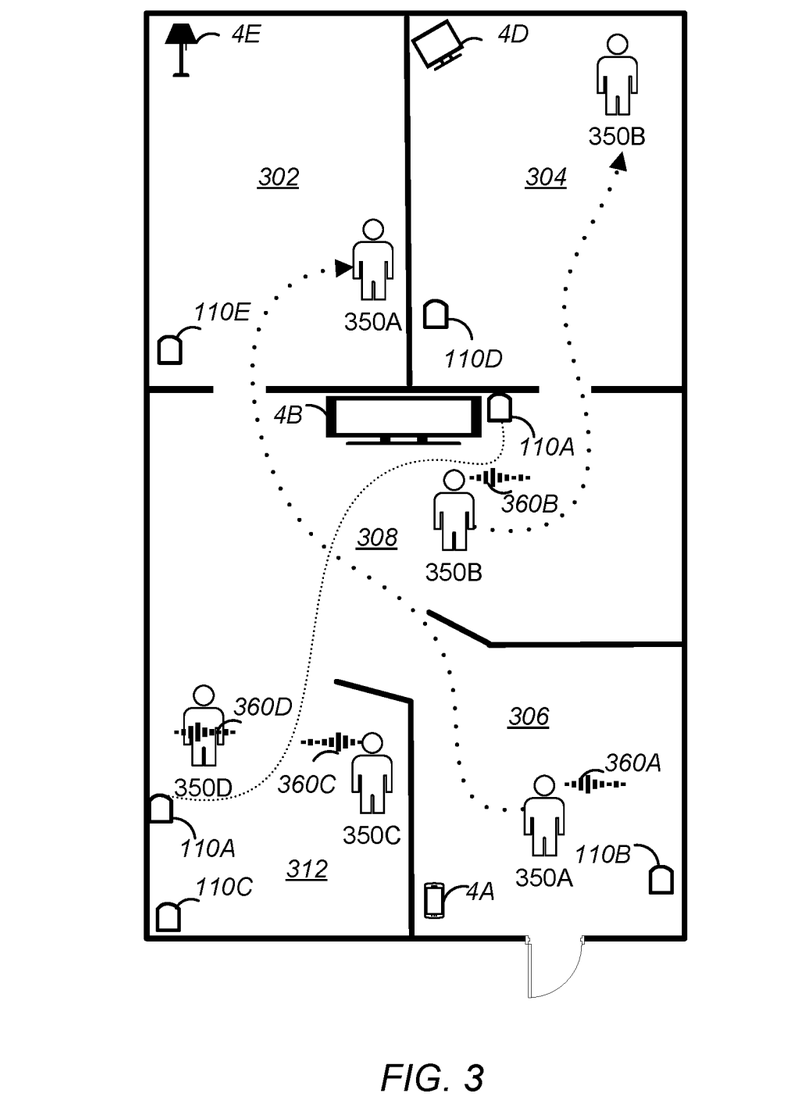
FIG. 3 illustrates a block diagram of a configuration of electronic devices in a user environment, according to one or more aspects of the present disclosure.

FIG. 3 illustrates a block diagram of a configuration of electronic devices in a user environment 300, according to one or embodiments of the present disclosure. User environment 300 can include a network environment, for example network environment 100, such that user environment 300 includes a wireless network with one or more electronic devices connected to the wireless network. The one or more electronic devices can include one or more client devices, such as client device 4A (for example, a mobile phone), client device 4B (for example, a first television 4B), a client device 4C (for example, a multi-media player), a client device 4D (for example, a second television 4D), a client device 4E (for example, a lamp 4E)), and/or one or more network devices 110 (such as a first, second, third, fourth, fifth, sixth, and seventh auxiliary network devices, respectively referred to as auxiliary network devices 110B, 110C, 110D, and 110E, and/or a principal network device 110A). User environment 300 can include one or more rooms or locations, for example, any of a first user location 302 (for example, a first bedroom 302), a second user location 304 (for example, a second bedroom 304), a third user location 306 (for example, a foyer 306), a fourth user location 308 (for example, a living room 308), a fifth user location 310 (for example, a media room 310), a sixth user location 312 (for example, a kitchen 312), a seventh user location 314 (for example, a patio 314), an eighth user location 316 (for example, a sun room 316), any other user location, or any combination thereof.

Any one or more users 350 (for example, Users 350A, 350B, 350C, and/or 350D) can traverse from one user location to another user location throughout the user environment 300 as indicated by the dotted lines in FIG. 3. For example, a User 350A can enter user environment 300 at the foyer 306. User 350A can issue a voice command 360A to an auxiliary network device 110B. The voice command 360A can be a first profile command 256 to turn on a light (for example, a lamp 4E) in the first bedroom 302 associated with an auxiliary network device 110E. The auxiliary network device 110B can send the voice command 360A to the principal network device 110A and/or a network resource 6 which translates the voice command 360A to a command or instruction interpretable or processable by the auxiliary network device 110E, for example, a first default command 254 that corresponds to the first profile command 256. In this way, the user 350A can have a customizable command that turns on a light 4E in the bedroom 302 without having to use a lengthy default command associated with the light 4E.

In another example, a user 350B can view content on a television 4D in the living room 308. The user 350B can relay a voice command 360B (for example, a second profile command 256) to the principal network device 110A to display the same content on the second television 4D in the second bedroom 304 as being displayed on the first television 4B. The principal network device 110A can translate or format the voice command 360B to an associated default command 254 that is interpretable or processable by the auxiliary network device 110E. The auxiliary network device 110E receives the translated or formatted command and sends an instruction to the second television 4D to display the requested content.

In one or more embodiments, Users 350C and 350D can be at a user location, for example, a kitchen 312. User 350C can be associated with a first profile configuration 216 and the User 350D can be associated with a second profile configuration 216. The auxiliary device 110C can receive a sound command 360D from User 350D and a voice command 360C from User 350C (collectively referred to as commands 360). In one or more embodiments, the auxiliary device 110C can process both commands 360, send one or both commands 360 to the principal network device 110A, send one or both commands 360 to a network resource 6, or any combination thereof. In one or more embodiments, the commands 360 can be preceded by a login or other authentication request by the User 350C and 350D so as to associate a profile configuration 216 with any one or more commands 360. For example, user 360D can make a sound command 360D that is associated with a first profile configuration 216 and a user 350C can speak a voice command 360C that is associated with a second profile configuration 216. In one or more embodiments, principal network device 110A can be located in or relocated to the kitchen 312 such that the principal device 110A receives the voice command 360C and sound command 360D and formats both of the commands for the auxiliary network device 110C. The principal network device 110A can receive a response from the auxiliary network device 110C and format the response based on the associated first profile configuration 216, the second profile configuration 216, or both. For example, the sound command 360D can be a double-whistle (for example, a first profile command 256) that corresponds to a first default command 254 of "What is the weather?" while the voice command 360C can be a phrase "Time now" that corresponds to a second profile command 256 that is indicative of a second default command 254 of "What is the time of day?" The principal network device 110A can receive one or more responses from the auxiliary network device 110C to the sound command 360D, voice command 360C, or both and format the one or more responses based at least in part, on one or more parameters of an associated profile configuration 216 (for example, an associated first and/or second profile response 258 associated with the first and/or second profile configuration 216).

In one or more embodiments, any one or more functionalities discussed with any network device 110 can be initiated by any user 350. Additionally, while any one or more commands 360 are identified as a voice or sound command, the present disclosure contemplates that the commands 360 can be voice, sound, or a combination thereof. In one or more embodiments, any one or more users 350 of the user environment 300 can configure or set one or more profile configurations 216 via a user interface 214 of any of the one or more network devices 110. The present disclosure contemplates that any one or more network devices 110 can be an auxiliary network device, a principal network device or both. Additionally, any functionality discussed with respect to any one network device 110 can be performed by any one or more other network devices 110, a network resource 6, or any combination thereof.

In one or more embodiments, a user 350B can traverse to a location outside of the user environment 300, for example, to a hotel, a business, or any other location. The User 350B can interact with a network device 110 at the location by logging in to a network resource 6 (for example, a cloud server) so as to access the User 350 B's profile configuration 216 so as to have the same user experience at the new location as that of user environment 300.

Figure 4:
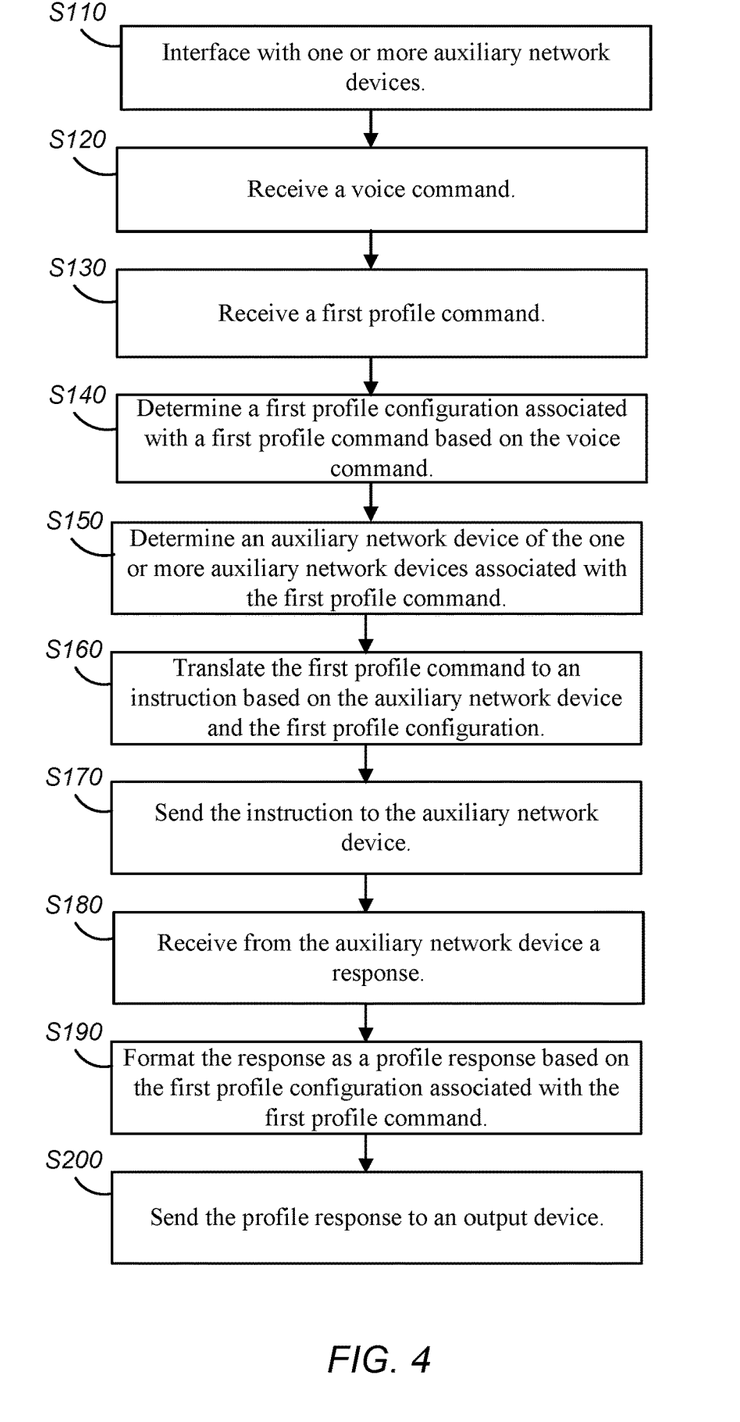
FIG. 4 is a flow chart illustrating a method for a principal network device to interface with one or more network devices so as to provide a customizable user experience, according to one or more aspects of the present disclosure.

FIG. 4 is a flow chart illustrating a method for a principal network device to interface with one or more auxiliary network devices, according to one or more aspects of the present disclosure. The one or more electronic devices, including, but not limited to, the principal network device, the auxiliary network device, and the network resource, may be programmed with one or more instructions that when executed by a processor or controller causes the one or more electronic devices to interface with any of one or more auxiliary network devices, one or more users, the network resource, any other electronic device, or any combination thereof. In FIG. 4, it is assumed that any one or more of the electronic devices include their respective controllers and their respective software stored in their respective memories, as discussed above in connection with FIGS. 1-3, which when executed by their respective controllers perform the functions and operations in accordance with the example embodiments of the present disclosure (e.g., including interfacing with any of the one or more electronic device to provide a customizable user environment). While the steps S110-S200 are presented in a certain order, the present disclosure contemplates that any one or more steps can be performed simultaneously, substantially simultaneously, repeatedly, in any order, or not at all.

At step S110, the principal network device interfaces with one or more auxiliary network devices, for example, in a user environment of a network environment. The principal network device can interface with one or more electronic devices, including the one or more auxiliary network devices, via a wireless network as discussed with reference to FIG. 1. The interfacing can provide for a two-way communication between the principal network device and any one or more electronic devices.

At step S120, the principal network device receives a voice command from a user. The voice command can be a command that associates the user with a profile configuration. For example, the voice command can comprise a login request from the user. The voice command can be analyzed locally or can be sent to a network resource for analysis.

At step S130, the principal network device receives a first profile command from a user, an auxiliary network device, any other electronic device in the network environment, or any combination thereof. The first profile command can be associated with an action. For example, the principal network device can translate the first profile command to an instruction interpretable or executable by the intended electronic device, for example, the auxiliary network device. In another example, the principal network device can send the first profile command to a network resource and the network resource can translate the first profile command to an instruction interpretable or executable by the intended electronic device. The instruction is then sent to the principal network device for communicating or sending to, for example, the auxiliary network device.

In one or more embodiments, the first profile command can comprise a request to alter or control an operation of any one or more electronic devices. In one or more embodiments, the profile command can comprise a request to customize a response provided by an electronic device to a particular profile command. For example, a profile configuration can have one or more actions that correspond to a default command. A user can customize the response from an electronic device to a particular profile command associated with an action based on the request to customize a response. In one or more embodiments, the request to customize a response can be part of a initiation or request to create a profile configuration associated with the user.

At step S140, the principal network device determines the first profile configuration associated with a profile command based on the voice command. The user can initialize or create a profile configuration via a user interface of the principal network device, the network resource, or both. During the initialization, the user can set up one or more parameters of a profile configuration associated with the user, including storing an audio recording associated with the user. The audio recording can be stored at the principal network device. However, storing the audio recording at the network resource allows the user to have a seamless network experience when the user transitions from one location to another. The principal network device can authorize or approve the login request using any one or more utilities, functions, or software. For example, the principal network device can initiate a voice recognition application that compares the voice command or login request to a profile configuration parameter, such as a stored audio recording of the user. An authorization response can then be utilized to determine a profile configuration associated with the login request or voice command. In another example, the principal network device sends the login request, a stored audio recording, or both to the network resource for analysis and authorization. The network resource can compare the login request to a stored audio recording at the network resource, a received stored audio recording from the principal auxiliary device, or both. The principal network device can receive an authentication response from the network resource (for example, that indicates authorization of the user based on the login request), the first profile configuration, or both. In this way, the principal network devices can determine the profile configuration associated with the login request or voice command based on the authorization.

At step S150, the principal network device determines an auxiliary network device of the one or more auxiliary network devices associated with the first profile command. For example, the first profile command can be associated with an action of the determined first profile configuration. The action can be associated with a parameter of the first profile configuration that indicates a specific auxiliary network device. In another example, an auxiliary network device can be determined based on any of a proximity to a user, a location of the auxiliary network device, a location of the user, a location associated with the associated action, one or more capabilities, features, and/or functions of the auxiliary network device, any other parameter associated with the first profile configuration, or any combination thereof.

At step S160, the principal network device translates the first profile command to an instruction based on the auxiliary network device and the first profile configuration. For example, the first profile command of the first profile configuration can map to an associated default command that provides the instruction expected or interpretable by the auxiliary network device. The principal network device translates the first profile command to an instruction that is or is based on the default command.

At step S170, the principal network device sends the instruction to the auxiliary network device. The instruction can be sent directly or indirectly to the auxiliary network device. In one or more embodiments, the instruction is received from a network resource and then sent by the principal network device to the auxiliary network device. In one or more embodiments, the network resource sends the instruction to the auxiliary network device.

At step S180, the principal network device receives from the auxiliary network device a response. The response can be based on the instruction sent to the auxiliary network device, a command received by the auxiliary network device (for example, a command from a user), or both.

At step S190, the principal network device formats the response from the auxiliary network device as a profile response based on the first profile configuration associated with the first profile command. For example, a user in a user environment can configure or create a profile configuration that includes a parameter, a profile response, that adapts a default response from an electronic device to a customized response. In this way, the user receives the same formatted response to a profile command no matter the location or electronic device.

At step S200, the principal network device can send the profile response to an output device. The output device can be part of or connected to any of the principal network device, the auxiliary network device, any other auxiliary network device, a client device, any other electronic device, or a combination thereof. For example, the profile response can be sent to the auxiliary network device for output via a speaker of the auxiliary network device. In another example, the profile response can be sent to a different auxiliary network device than the auxiliary network device that received the instruction at step S170. For example, if the instruction is sent to the auxiliary network that does not include a visual display and the first profile configuration profile requires a visual display of all response, the profile response can be sent to another electronic device that meets the requirements of the first profile configuration.

In one or more embodiments, multiple users or a single user can be associated with a second profile command. This second profile command can be received by any electronic device, such as an auxiliary network device, a principal network device or both. A second profile configuration associated with this second profile command can be determined. Any number of profile configurations can be associated with any user environment such that any one or more profile configurations are different from any one or more other profile configurations. This second profile command can be analyzed, processed, or otherwise executed according to one or more of the steps discussed.

While the steps S110-S200 discuss particular electronic devices, the present disclosure contemplates that any functionality can be performed by any of a principal network device, an auxiliary network device, a network resource, or any combination thereof.

According to some example embodiments of inventive concepts disclosed herein, there are provided novel solutions for providing an interface between any of a principal network device, an auxiliary network device, a network resource, or any combination thereof. A user environment can be enhanced by providing a profile configuration associated with the user that allows the user to customize commands to and response from any one or more electronic devices in the user environment. The user can login to a principal network device, a network resource, or both so that the user's preferences for interfacing with one or more electronic devices is consistent no matter the location of the one or more electronic devices, a location of the user, or both. Providing a customizable interface between electronic devices of a user environment allows consistency in the user experience and enhances the QoE of the user.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A principal network device of a network for interfacing with one or more auxiliary network devices of the network comprising:

a memory storing one or more computer-readable instructions; and a processor configured to execute the one or more computer-readable instructions to:
- interface with the one or more auxiliary network devices via the network;
- receive a first profile command associated with a first action, a first default command associated with one or more actions or both of a first profile configuration associated with a first user, wherein the first profile configuration comprises a profile identifier that is unique to the first profile configuration, the first action, the first profile command associated with the first action, a first profile response associated with the first profile command, and the first default command, and wherein the first profile command comprises a customizable command associated with the action;
- determine the first profile configuration associated with the first profile command;
- determine an auxiliary network device of the one or more auxiliary network devices associated with the first profile command;
- translate the first profile command to an instruction based on the auxiliary network device and the first profile configuration; and
- send the instruction to the auxiliary network device.

2. The principal network device of claim 1, wherein the processor is further configured to execute the one or more instructions to:
- receive from the auxiliary network device a response to the instruction;
- format the response as a profile response based on the first profile configuration associated with the first profile command; and
- send the profile response to an output device.

3. The principal network device of claim 1, wherein the processor is further configured to execute the one or more instructions to:
- receive a voice command; and
- determine the first profile configuration associated with the first profile command based on the voice command.

4. The principal network device of claim 3, wherein the voice command comprises a login request, and wherein the processor is further configured to execute the one or more instructions to:
- receive the login request;
- send the login request to a network resource;
- receive an authentication response from the network resource; and
- wherein determining the first profile configuration is based on the authentication response.

5. The principal network device of claim 1, wherein the first profile command comprises a request to customize a response provided by the auxiliary network device for a particular profile command, and wherein sending the instruction to the auxiliary network device comprises one or more instructions to configure the response provided by the auxiliary network device.

6. The principal network device of claim 1, wherein the first profile command comprises a non-vocal command.

7. The principal network device of claim 1, wherein the processor is further configured to execute the one or more instructions to:
- receive a second profile command;
- determine a second profile configuration associated with the second profile command,
- wherein the second profile configuration is different than the first profile configuration; translate the second profile command to an instruction based on the auxiliary network device and the second profile configuration; and
- send the instruction to the auxiliary network device.

8. A method for a principal network device of a network to interface via the network with one or more auxiliary network devices of the network, the method comprising:
- receiving a first profile command associated with a first action, a first default command associated with one or more actions or both of a first profile configuration, associated with a first user, wherein the first profile configuration comprises a profile identifier that is unique to the first profile configuration, the first action, the first profile command associated with the first action, a first profile response associated with the first profile command, and the first default command, and wherein the first profile command comprises a customizable command associated with the action;
- determining the first profile configuration associated with the first profile command;
- determining an auxiliary network device of the one or more auxiliary network devices associated with the first profile command;
- translate the first profile command to an instruction based on the auxiliary network device and the first profile configuration; and
- send the instruction to the auxiliary network device.

9. The method of claim 8, further comprising:
- receiving from the auxiliary network device a response to the instruction;
- formatting the response as a profile response based on the first profile configuration associated with the first profile command; and
- sending the profile response to an output device.

10. The method of claim 8, further comprising:
- receiving a voice command; and
- determining the first profile configuration associated with the first profile command based on the voice command.

11. The method of claim 10, further comprising:
- receiving a login request, wherein the voice command comprises the login request;
- sending the login request to a network resource;
- receiving an authentication response from the network resource; and
- wherein determining the first profile configuration is based on the authentication response.

12. The method of claim 8, wherein the first profile command comprises a request to customize a response provided by the auxiliary network device for a particular profile command, and wherein sending the instruction to the auxiliary network device comprises one or more instructions to configure the response provided by the auxiliary network device.

13. The method of claim 8, where the first profile command comprises a non-vocal command.

14. The method of claim 8, further comprising:
- receiving a second profile command;
- determining a second profile configuration associated with the second profile command, wherein the second profile configuration is different than the first profile configuration;
- translating the second profile command to an instruction based on the auxiliary network device and the second profile configuration; and
- sending the instruction to the auxiliary network device.

15. A non-transitory computer-readable medium of a principal network device of a network storing one or more instructions for interface via the network with one or more auxiliary network devices of the network, which when executed by a processor of the principal network device, cause the principal network device to perform one or more operations comprising:

receiving a first profile command associated with a first action, a first default command associated with one or more actions, or both of a first profile configuration, associated with a first user, wherein the first profile configuration comprises a profile identifier that is unique to the first profile configuration, the first action, the first profile command associated with the first action, a first profile response associated with the first profile command, and the first default command, and wherein the first profile command comprises a customizable command associated with the action;

verifying the first profile command, wherein the first profile command is associated with the first profile configuration;

determining an auxiliary network device of the one or more auxiliary network devices associated with the first profile command;

translating the first profile command to an instruction based on the auxiliary network device and the first profile configuration; and     sending the instruction to the auxiliary network device.

16. The computer-readable medium of claim 15, wherein one or more instructions when further executed by the processor cause the principal network device to perform one or more further operations comprising:

Receiving from the auxiliary network device a response to the instruction;

formatting the response as a profile response based on the first profile configuration associated with the first profile command; and     sending the profile response to an output device.

17. The computer-readable medium of claim 15, wherein one or more instructions when further executed by the processor cause the principal network device to perform one or more further operations comprising:

receiving a voice command; and determining the first profile configuration associated with the first profile command based on the voice command.

18. The computer-readable medium of claim 15, wherein one or more instructions when further executed by the processor cause the principal network device to perform one or more further operations comprising:

receiving a login request, wherein the voice command comprises the login request;

sending the login request to a network resource;

receiving an authentication response from the network resource; and     wherein determining the first profile configuration is based on the authentication response.

19. The computer-readable medium of claim 15, wherein the first profile command comprises a request to customize a response provided by the auxiliary network device for a particular profile command, and wherein sending the instruction to the auxiliary network device comprises one or more instructions to configure the response provided by the auxiliary network device.

20. The computer-readable medium of claim 15, wherein one or more instructions when further executed by the processor cause the principal network device to perform one or more further operations comprising:

receiving a second profile command;

determining a second profile configuration associated with the second profile command, wherein the second profile configuration is different than the first profile configuration;

translating the second profile command to an instruction based on the auxiliary network device and the second profile configuration; and     sending the instruction to the auxiliary network device.

\* \* \* \* \*